United States Patent
Eaton et al.

(10) Patent No.: US 11,416,726 B2
(45) Date of Patent: Aug. 16, 2022

(54) POWER MANAGEMENT

(71) Applicant: IDEX Biometrics ASA, Oslo (NO)

(72) Inventors: Anthony Michael Eaton, Hampshire (GB); Peter Eckehard Kollig, Hampshire (GB); Keith Ahluwalia, Wiltshire (GB); Tuck Weng Poon, Hampshire (GB)

(73) Assignee: IDEX Biometrics ASA, Oslo (NO)

( * ) Notice: Subject to any disclaimer, the term of this patent is extended or adjusted under 35 U.S.C. 154(b) by 0 days.

(21) Appl. No.: 16/980,157

(22) PCT Filed: Mar. 12, 2019

(86) PCT No.: PCT/EP2019/056163
§ 371 (c)(1),
(2) Date: Sep. 11, 2020

(87) PCT Pub. No.: WO2019/175174
PCT Pub. Date: Sep. 19, 2019

(65) Prior Publication Data
US 2021/0357716 A1 Nov. 18, 2021

(30) Foreign Application Priority Data
Mar. 12, 2018 (GB) ...................... 1803938

(51) Int. Cl.
*G06K 19/07* (2006.01)
(52) U.S. Cl.
CPC ..... *G06K 19/0712* (2013.01); *G06K 19/0709* (2013.01); *G06K 19/0718* (2013.01)

(58) Field of Classification Search
CPC ........... G06K 19/0712; G06K 19/0718; G06K 19/0709; G07C 9/25; G06Q 20/40145
See application file for complete search history.

(56) References Cited

U.S. PATENT DOCUMENTS 4,575,621 A * 3/1986 Dreifus ................... G07C 9/25
235/487
6,819,219 B1 * 11/2004 Bolle ..................... G07C 9/257
340/5.52

(Continued)

FOREIGN PATENT DOCUMENTS

WO 2010019961 2/2010
WO 2016055661 4/2016

OTHER PUBLICATIONS

PCT Application No. PCT/EP2019/056163 International Search Report and Written Opinion, dated Jun. 4, 2019, 15 pages.

*Primary Examiner* — Daniel I Walsh
(74) *Attorney, Agent, or Firm* — Smith Tempel Blaha LLC; Michael J. Tempel

(57) ABSTRACT

A device comprising: an antenna; a power harvesting circuit for harvesting power from a radio frequency field received at the antenna in order to power functions of the device; a communication unit coupled to the antenna for transmitting and receiving signals by means of the antenna, the communication device being configured to communicate according to a protocol in which a party to a communication session deems the session to have timed out if during a predetermined period it does not receive a signal from another party to the session; and a module comprising a processing circuit; the device being configured to interrupt the operation of the module when the communication unit is transmitting a signal by means of the antenna.

14 Claims, 5 Drawing Sheets

(56) References Cited

U.S. PATENT DOCUMENTS

| | | | | |
|---|---|---|---|---|
| 7,003,316 B1* | 2/2006 | Elias | ............... | G06Q 20/20 |
| | | | | 455/556.1 |
| 10,133,979 B1* | 11/2018 | Eidam | ............... | G06K 19/145 |
| 10,445,733 B1* | 10/2019 | Wurmfeld | ............... | G06F 1/324 |
| 10,474,802 B2* | 11/2019 | Wendling | ............... | G06Q 20/3278 |
| 10,692,312 B1* | 6/2020 | Niranjayan | ............... | G07C 9/25 |
| 2003/0159044 A1* | 8/2003 | Doyle | ............... | G06F 21/445 |
| | | | | 713/176 |
| 2008/0223925 A1* | 9/2008 | Saito | ............... | G07F 7/1008 |
| | | | | 235/380 |
| 2009/0169172 A1* | 7/2009 | Tsukamoto | ............... | H04N 5/76 |
| | | | | 386/343 |
| 2009/0259612 A1* | 10/2009 | Hanson | ............... | H04L 69/22 |
| | | | | 706/47 |
| 2010/0039234 A1* | 2/2010 | Soliven | ............... | H04B 5/02 |
| | | | | 340/10.1 |
| 2012/0022382 A1* | 1/2012 | Daisuke | ............... | A61B 5/14551 |
| | | | | 600/481 |
| 2012/0022958 A1* | 1/2012 | de Sylva | ............... | G06Q 30/06 |
| | | | | 340/5.82 |
| 2012/0235796 A1* | 9/2012 | Kishimoto | ............... | G06Q 20/352 |
| | | | | 235/492 |
| 2014/0210589 A1* | 7/2014 | Grace | ............... | G06F 21/32 |
| | | | | 340/5.51 |
| 2015/0066604 A1* | 3/2015 | Jeong | ............... | G06Q 20/145 |
| | | | | 705/13 |
| 2017/0300680 A1* | 10/2017 | Wendling | ............... | G06K 9/00013 |
| 2020/0293252 A1* | 9/2020 | Takato | ............... | G06F 3/1285 |
| 2020/0311509 A1* | 10/2020 | Benkley, III | ............... | G06F 21/32 |
| 2020/0356693 A1* | 11/2020 | Chiasson | ............... | G06F 21/40 |
| 2021/0104118 A1* | 4/2021 | Schwartz | ............... | G06Q 20/3274 |
| 2021/0112397 A1* | 4/2021 | Viken | ............... | H04W 12/06 |
| 2021/0192529 A1* | 6/2021 | Souchon | ............... | G06Q 20/401 |
| 2021/0304185 A1* | 9/2021 | Fisher | ............... | G06Q 20/327 |
| 2021/0357716 A1* | 11/2021 | Eaton | ............... | G06K 19/0712 |

\* cited by examiner

| Use case | SE | Biometric MCU | ASIC | SE | Biometric MCU | FPS ASIC | Total |
|---|---|---|---|---|---|---|---|
| Card boot | SE boot | MCU boot | ASIC standby mode | 5 | 1 | 1 | 7 |
| EMV application | SE run EMV app | MCU low power mode | ASIC standby mode | 9 | 1 | 1 | 11 |
| SE to MCU comms | SE to MCU I2C comms | MCU to SE I2C comms | ASIC standby mode | 5 | 3 | 1 | 9 |
| ASIC boot | SE low power mode | MCU low power mode | ASIC boot + init | 1 | 1 | 4 | 6 |
| Image acquisition | SE low power mode | MCU low power mode | ASIC image acquisition | 1 | 1 | 5 | 7 |
| Image transfer | SE low power mode | MCU image transfer | ASIC image transfer | 1 | 2 | 2 | 4 |
| Image process | SE low power mode | MCU image process | ASIC standby mode | 1 | 3 | 1 | 5 |
| Image match | SE low power mode | MCU extract/match | ASIC standby mode | 1 | 2 | 1 | 4 |
| SE to MCU comms | SE to MCU I2C comms | MCU to SE I2C comms | ASIC standby mode | 5 | 3 | 1 | 8 |
| S(WTX) transmission | S(WTX) transmission | MCU low power mode | ASIC low power mode | 2 | 1 | 1 | 4 |

FIG. 5

POWER MANAGEMENT

This invention relates to power management, for example in systems that receive power through contactless mechanisms. One example of such a system is a contactless smart card.

Contactless smart cards are commonly used for authenticating secure transactions, for example payment transactions or approval of entry to a building. Contactless cards typically comprise an antenna that can be energised inductively by a terminal. The card harvests energy from the antenna and uses that energy to drive circuitry in the card. The circuitry performs an authentication function and returns data to the terminal via the antenna. Some smart cards that are capable of contactless operation may additionally have contacts so that they can be powered by a contact-based mechanism.

Conventional contactless cards include a secure element (SE) which may be implemented as a single integrated circuit. The antenna is connected to the secure element. The secure element manages power harvesting and can transmit and receive messages via the antenna. Typical secure elements operate in accordance with ISO/IEC 14443, which defines a wireless communication protocol including physical characteristics, a radio frequency power and signal interface, and initialisation, transmission and anticollision protocols.

It would be desirable for contactless cards to be capable of performing biometric verification of a user. For example, when a user wants to make a payment using a card, the card could check the identity of the user by capturing a biometric feature such as a fingerprint of the user, an image of the user or a vein pattern of the user. The card could then compare that biometric feature with stored data defining the corresponding feature of the person authorised to use the card, and if the two match could authorise the transaction. In order to achieve that in a contactless manner, it would be desirable for the biometric verification functions of the card to be powered over the same wireless interface as is conventionally used. This would allow the biometric-capable card to be compatible with existing card terminals.

Reading and processing biometric data in this way typically uses considerably more power and takes considerably more time than are used by a normal secure element to authorise a transaction. For this reason, integrating biometric functions into a contactless-capable card raises a number of problems.

It would be desirable to be able to manage power availability in a contactless-capable system so as to make it better able to support functions such as biometric verification.

According to one aspect there is provided a device comprising: an antenna; a power harvesting circuit for harvesting power from a radio frequency field received at the antenna in order to power functions of the device; a communication unit coupled to the antenna for transmitting and receiving signals by means of the antenna, the communication unit being configured to communicate according to a protocol in which a party to a communication session deems the session to have timed out if during a predetermined period it does not receive a signal from another party to the session; and a module comprising a processing circuit; the device being configured to interrupt the operation of the module when the communication unit is transmitting a signal by means of the antenna.

The communication unit may be configured to: receive a request for identity verification from a first party to a communication session in which the device is also a party; in response to receiving that request, signal the module to perform an identity verification process; maintain the communication session until the identity verification process is complete by periodically transmitting a message to the first party; receive the result of the identity verification process from the module; and transmit the result of the identity verification process to the first party.

The communication unit may be configured to maintain the communication session until the identity verification process is complete by periodically transmitting a wait time extension message to the first party.

The communication unit may be configured to, on transmitting the message to the first party, signal the module with a signal of a first format. The module may be configured to, in response to receiving a signal of the first format, resume operation.

The module may be configured to, on receiving a signal of the first format, transmit an acknowledgement signal to the communication unit.

The communication unit may be configured to, a predetermined time interval after transmitting a message to the first party, signal the module with a signal of a second format. The module may be configured to, in response to receiving a signal of the second format, interrupt operation.

The module may be configured to, on interrupting operation, transmit a signal to the communication unit.

The first and second signals may be represented by high and low states of a single signal line. The first signal may be represented by one of a high and a low state of the single signal line. The second signal may be represented by the other state.

The module may be configured to, on suspending operation, store the state of at least one active component of the module, and set at least that component in a low power state.

The module may be configured to, on beginning or resuming operation, sense the amount of power available from the power harvesting circuit and select for execution a task requiring not more than the available power.

The module may comprise a first subsystem having a relatively high power requirement and a second subsystem having a relatively low power requirement. The module may be configured to, on beginning or resuming operation, sense the amount of power available from the power harvesting circuit and, if a first task involving use of the first subsystem and a second task involving use of the second subsystem and not the first subsystem are both available for execution, select for execution the second task if insufficient power is available to meet the requirement of the first subsystem.

The module may be configured to, if sufficient power is available to meet the requirement of the first subsystem, select the first task for execution.

The module may be configured to, on beginning or resuming operation, sense the amount of power available from the power harvesting circuit and, if a first task having a first power requirement is available for execution, to commence execution of that task only if sufficient power is available to complete the task.

The communication unit may be implemented in a first integrated circuit. At least part of the module may be implemented in a second integrated circuit.

The first integrated circuit may be a secure element.

The device may be in the form of a card.

The device may be an identity verification device. The module may be a biometric reader comprising a sensor for sensing a biometric feature. The processor may be configured to process data sensed by the sensor to form processed data and compare the processed data with data defining a reference biometric feature so as to verify the sensed biometric feature.

The module may be a fingerprint reader.

According to a second aspect there is provided a method for verifying the identity of a user by means of a device having an antenna, the method comprising: harvesting power from a radio frequency field received at the antenna in order to power functions of the device; communicating with a party external to the device by transmitting and receiving signals by means of the antenna according to a protocol in which a party to a communication session deems the session to have timed out if during a predetermined period it does not receive a signal from another party to the session; operating a biometric reader of the device to sense a biometric feature to process data sensed by the sensor and to compare the processed data with data defining a reference biometric feature so as to verify the sensed biometric feature; and suspending the operation of the biometric reader when the communication unit is transmitting a signal by means of the antenna.

According to a third aspect there is provided biometric module implemented on a single integrated circuit, the biometric module comprising: a first input for receiving signals from an antenna; a power harvesting circuit for harvesting power from a radio frequency field received at the first input and arranged to power functions of the module; a sensor input for receiving data from a biometric sensor; a processor configured for processing data sensed by the sensor; a control input; and a control unit, the control unit being configured to suspend the operation of the processor in response to a signal of a first predetermined format being received at the control input and to resume the operation of the processor in response to a signal of a second predetermined format being received at the control input.

The processor may be configured for processing data sensed by the sensor to form processed data and comparing the processed data with data defining a reference biometric feature so as to verify the sensed biometric feature.

The present invention will now be described by way of example with reference to the accompanying drawings. In the drawings:

FIG. 5 shows an example of a table storing power usage information.

The description below will be made with reference to a contactless smart card. The systems to be described are suitable for use with devices that are not in the form of a card. The systems to be described are suitable for use with devices that perform functions other than payment functions, for example physical access control functions or generalised identity authentication functions. The systems to be described are suitable for devices that include contacts by which they can be powered as a supplement to or as an alternative to contactless operation.

Figure 1:
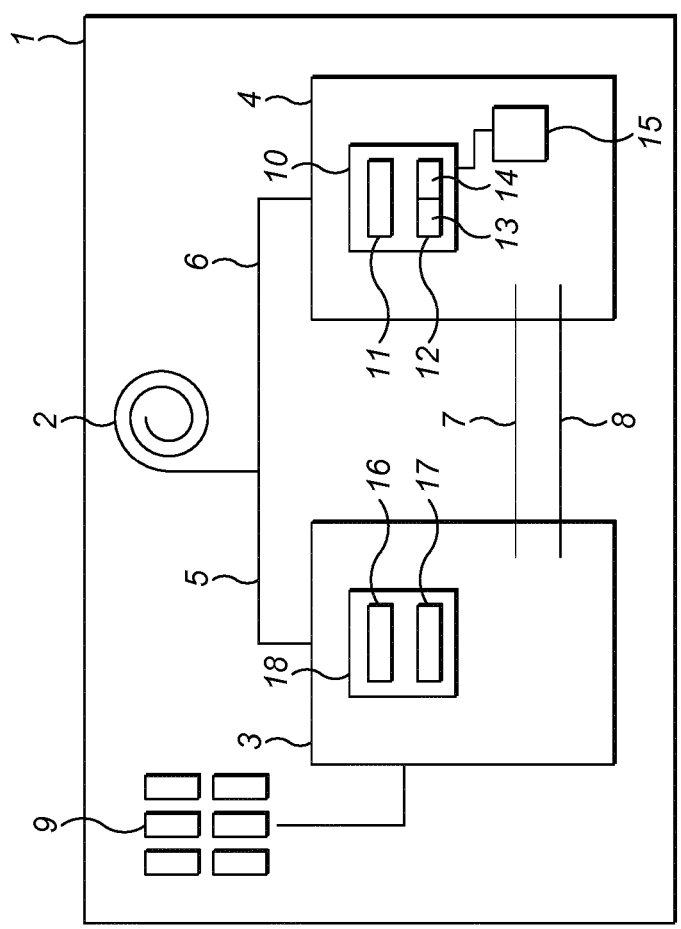
FIG. 1 shows a generalised example architecture for a contactless smart card.

FIG. 1 shows a generalised example architecture for a smart card capable of operating in a contactless mode. The card includes a body 1. The body may be of the same size and shape as a conventional smart card, or of a different size/shape. For example, the card may be substantially cuboid in shape, with one dimension substantially less than both the others, e.g. less than 10% of either of the other dimensions. The thickness of the card may be between 0.5 mm and 2.0 mm. The card may satisfy the physical dimensions set out in ISO/IEC 7810 as at 1 Feb. 2018 for an ID-1 card. Embedded in the card are an antenna 2, a secure element 3 and a biometric device or module 4. The antenna may comprise one or more coils of conductive material. The antenna is capable of receiving power and transmitting and receiving data signals according to whatever protocol the card is configured to support. That may, for example, be a protocol as defined in ISO/IEC 14443 or another protocol, for example a proprietary protocol. The secure element may conveniently be implemented as a single integrated circuit.

The principles described below may be applied in cards that can operate only in a contactless mode (i.e. a mode in which a non-electrical transmission path is used for communication between the card and a terminal and/or for energising circuitry on the card). The principles described below may also be applied in cards that can operate in both a contactless mode and in a contact mode that employs an electrical transmission path for communication between the card and the terminal and/or for energising circuitry on the card. Such a dual-mode card may be capable of operating in both modes simultaneously and/or at different times.

The secure element 3 is shown coupled to the antenna via a link 5. Through link 5 the secure element may be capable of harvesting power from a radio frequency field incident on the antenna when operating in a fully or partially contactless mode. The secure element may be capable of processing signals received by the antenna to detect signals transmitted to the card by a card terminal, and of driving the antenna to transmit signals to a terminal. The secure element is capable of implementing a security protocol. For example, it may be capable of generating a response to a challenge received from the card terminal by means of which the card can be identified, or it may be capable of returning a signal to the terminal that indicates whether data received from the card terminal such as a personal identification number entered into the terminal by a user matches a number stored in the secure element.

The biometric element 4 may be interconnected to the antenna and/or the secure element in a number of ways, as illustrated in FIG. 1. Through link 6 the biometric element may be capable of harvesting power from a radio frequency field incident on the antenna when operating in a fully or partially contactless mode. The biometric element may be capable of processing signals received by the antenna to detect signals transmitted to the card by a card terminal, and of driving the antenna to transmit signals to a terminal. The biometric element can implement a biometric identification process, as will be described in more detail below. Such a terminal may be a card reader. The card reader may be coupled to a system that is configured to provide access to resources in dependence on the successful verification of an identity by the terminal. Such resources may, for example, be financial or may be physical access to a space.

The secure element 3 and the biometric element 4 are shown being interconnected by a power link 7 and one or more data links 8. Each of the links may be a bus.

Contacts 9 are exposed on the surface of the card. These may provide power to one or both of the secure element and the biometric element when operating in contact mode. The contacts may also be used for data communication when operating in contact mode.

The processes of contactless power harvesting and data communication on the card may be implemented in a number of ways. For example:

1. Link 6 may be omitted. In, for example, contactless mode, the biometric element is powered over power link 7 by power harvested by the secure element. The biometric element communicates with the terminal via the secure element.

2. Link 5 may be omitted. In, for example, contactless mode, the secure element is powered over power link 7 by power harvested by the biometric element. The secure element communicates with the terminal via the biometric element.

3. Links 5 and 6 may be present. In, for example, contactless mode, the secure element and the biometric element both harvest power and communicate directly through the antenna 2 with the terminal. In this case links 7 and/or 8 may be omitted.

4. Links 5 and 6 may be present. In, for example, contactless mode, the secure element and the biometric element both harvest power directly from the antenna, but only one of the secure element and the biometric element handles direct communications through the antenna 2 with the terminal. The other of the secure element and the biometric element communicates indirectly with the terminal over data link 8.

Other arrangements are possible. For example, the secure element and at least some of the processing features of the biometric element could be integrated as a common single integrated circuit. A sensor of the biometric element could be implemented on a separate substrate from the remainder of the biometric element. Some processing functions described below as being performed by the biometric element could be implemented in an integrated circuit that also provides the secure element whilst other processing functions described below as being performed by the biometric element could be implemented in an integrated circuit separate from an integrated circuit that provides the secure element. Some or all functions of the secure element and/or the biometric element could be provided by discrete components.

The biometric element or module may be implemented in any suitable way. The manner of implementing the biometric element will depend on the type of biometric data it is intended to collect and verify. In one convenient example, the biometric element comprises a single integrated circuit 10. The integrated circuit comprises a processor 11 and a memory 12. The memory 12 has a region 13 which stores in a non-transitory manner code that is executable by the processor 11 to perform the logic functions described herein of the biometric element. The memory 12 may have a region 14 which stores biometric validation data. The biometric validation data represents reference biometric data for an authorised user of the card. Alternatively, such biometric validation data may be stored in the secure element. Biometric data captured by the biometric element can be compared with the validation data to assess whether it is representative of the authorised user. In one example, that comparison may be done in the biometric element, e.g. by processor 11. In another example, that comparison may be done by a processor in the secure element. The biometric element also includes a biometric capture device 15. The nature of the biometric capture device will depend on the type of biometric data that is to be used. Some examples are: a fingerprint sensor for capturing fingerprints; a camera for capturing facial images, retina images or iris images; a vein pattern sensor for capturing vein patterns; a microphone for capturing voice patterns; or an accelerometer for capturing movement data. The biometric element may include multiple sensors for capturing multiple types of biometric data, or for capturing multiple instances of biometric data of the same type: for example for capturing fingerprints on both sides of the card simultaneously.

The secure element 3 comprises a processor 16 and a memory 17. The memory 17 stores in a non-transitory manner code that is executable by the processor 16 to perform the logic functions described herein of the secure element.

One or both of the secure element and the biometric element may include dedicated hardware for performing some or all of their functions.

Figure 2:
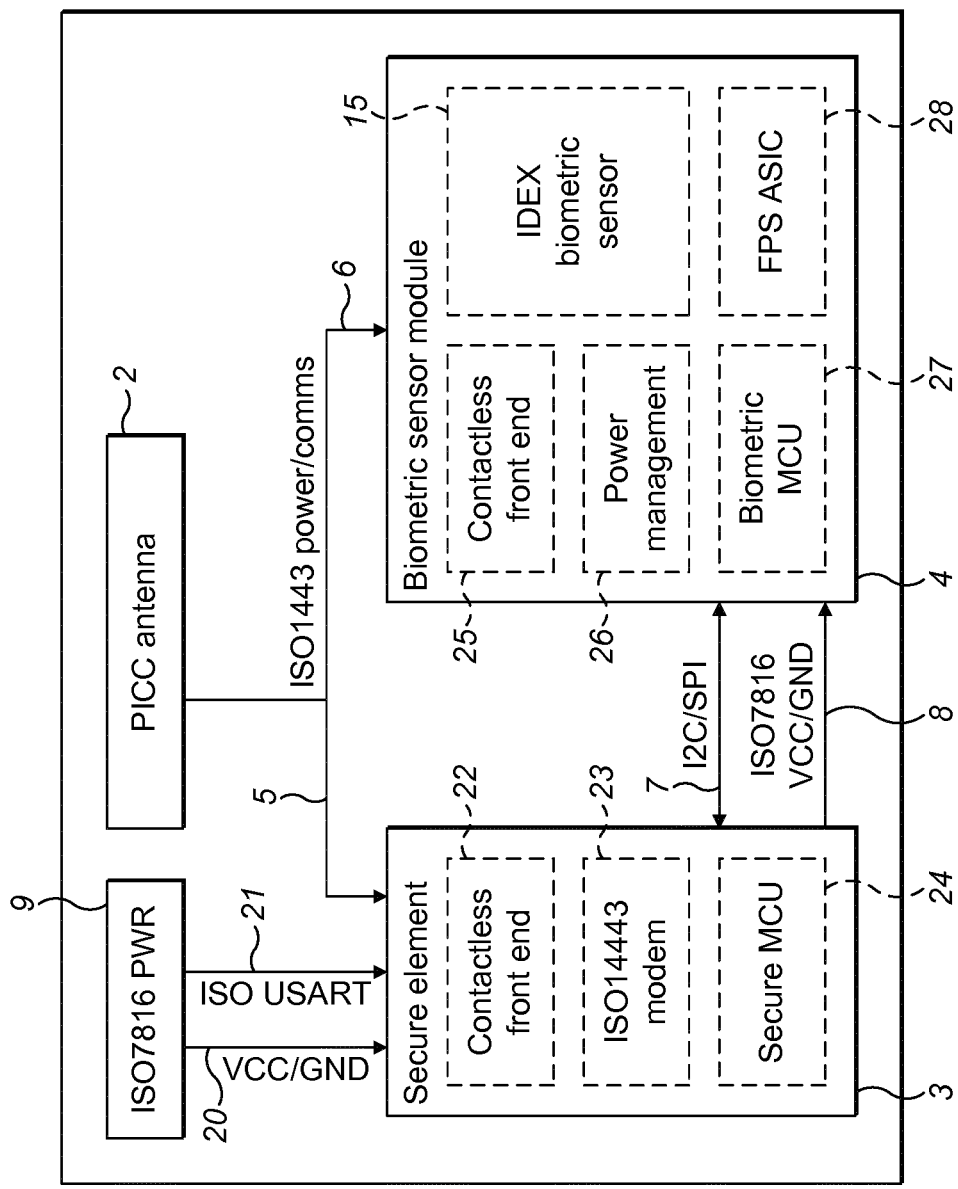
FIG. 2 shows an example architecture for a contactless smart card.

FIG. 2 shows in more detail an example architecture for a contactless card. In FIG. 2 features corresponding directly to those in FIG. 1 are designated by like numerals.

The card of FIG. 2 comprises an antenna 2, a secure element 3 and a biometric element 4. The antenna is connected to the secure element by a link 5, and to the biometric element by a link 6. A data link 7, and a power link 8 run between the secure element 3 and the biometric element 4. Contacts 9 are provided for powering the card and/or for data communications when operating in contact mode. The contacts 9 are connected to the secure element 3 by a power link 20 and a data link 21.

The links described above may comprise one or more physical connector paths. That or those physical connector paths may support one or more logical communication links.

In the example of FIG. 2, the card is compatible with ISO/IEC 14443 for contactless communications. To that end, the antenna 2 is configured for efficient reception and of wireless power and reception and transmission of wireless data signals as defined by ISO/IEC 14443. The antenna may be a PICC (proximity integrated circuit card) antenna. In the example of FIG. 2, the card is compatible with ISO 7816, which defines a standard for smart card communications. To that end, the contacts 9 are configured for compatibility with ISO 7816.

The secure element has a set of subsystems 22, 23, 24. 22 is a contactless front end. It harvests power from the antenna and acts as a physical interface between modem 23 and the antenna. In this example, the modem supports ISO/IEC 14443. The secure element also includes a secure MCU (microcontroller unit) 24. The secure MCU supports whatever security protocol is implemented by the secure element. For example, it may support the EMVCo® (Europay, Mastercard, Visa) protocol for authentication. The secure MCU also manages communications over data link 7 with the biometric element 4.

The biometric element has a set of subsystems 25, 26, 27, 28 and a biometric sensor 15. 25 is a contactless front end. It harvests power from the antenna, e.g. when operating in contactless mode. 26 is a power management unit. It controls the other subsystems of the biometric element to switch them into a suitable state depending on the availability of power. The manner in which it does this will be described in more detail below. The biometric element has a biometric MCU 27 which manages the biometric operation of the biometric element and manages communications over data link 7 with the secure element 3. An ASIC (application-specific integrated circuit) 28 is configured to process data sensed by the biometric sensor 15. In some situations, capturing the sensed data using dedicated hardware can be more efficient than using a general-purpose processor.

As indicated above, the processes of harvesting power from the antenna and communicating with the card terminal may be distributed in various ways between the secure element and the biometric element. In the example of FIG. 2, they are performed as follows:

both the secure element and the biometric element can harvest power through their own connection to the antenna 2;

only the secure element communicates with the card terminal directly through the antenna 2: the biometric element communicates with the card terminal via data link 7 and the secure element.

Links 8 and 20 may each comprise VCC and ground connectors. They may suitably provide power in accordance with ISO 7816. Since the contacts 9 are connected to the secure element, the power link 8 may be capable of supplying power from the secure element to the biometric element.

Link 21 may be an ISO7816-compatible UART interface.

Links 7 and/or 8 may each independently be an I²C interface or a Serial Peripheral Interface (SPI) bus. Communications over link and/or link 8 may be encrypted.

In this example, sensor 15 is a fingerprint sensor, for example a 130×130 array of sensing elements. The sensor may, for example, be as described in U.S. Pat. No. 9,396,379, 8,791,792 or 9,779,280.

At a high level, the steps involved in having the card of FIG. 2 respond to an authentication request from a card terminal may be as follows:

1. A user attempts to undertake a transaction with a certain identity. The mechanisms for presenting and verifying the identity will depend on the physical hardware being used, and on the protocol being used (e.g. as specified in the EMVCo® standard).
2. The card is placed within range of a card terminal. Typically, the operating range will be 10 cm or less, and often 4 cm or less. The card may be kept within range of the terminal during the succeeding steps.
3. The card terminal transmits a signal comprising an authentication request. The authentication request signal may include data indicating the purported identity of the user and/or other data such as a PIN entered by the user. The signal may be in accordance with the ISO/IEC 14443 protocol.
4. The transmitted signal is received by the card. The secure element harvests power from the signal and boots up. The secure element reads the authentication request, and identifies that it needs biometric authentication in order to respond. The authentication request may be in accordance with the EMVCo® protocol.
5. The secure element signals the biometric element to activate it.
6. The biometric element begins harvesting power from the signal transmitted by the card terminal, and continues to do so whilst it is performing biometric authentication. The biometric element boots up.
7. The sensor 15 acquires biometric data, in this case a fingerprint.
8. The acquired biometric data is transferred to an element that is to process it, such as ASIC 28.
9. The biometric element (e.g. a biometric MCU) analyses the acquired biometric data to characterise it to a form suitable for comparison with stored reference data. This may involve pre-processing the biometric data and extracting features from the biometric data. Alternatively, feature extraction could be performed elsewhere: for example on the ASIC or the secure element.
10. The characterised acquired biometric data is compared with stored reference data. The comparison could be performed in the biometric element or the secure element or the ASIC. The stored reference data may be known as a template. Conveniently the template is stored in or locally to the unit that performs the comparison. The stored reference data represents the appropriate biometric data of the genuine user of the card. This comparison generates a result, which may be a successful match or a failure to match.
11. The biometric element returns the result to the secure element. The result is communicated as an encrypted message over data link 7.
12. The secure element generates a response to the authentication request and causes the response to be transmitted by the card's antenna. The response indicates whether biometric authentication was successful. The response may be in accordance with the EMVCo® protocol.
13. The card terminal receives the response and grants or denies the transaction requested by the user in dependence on whether the response indicates that authentication was successful.

In addition to the biometric authentication, the secure element may perform authentication steps, for example by verifying a PIN or responding to a challenge sent by the terminal.

The ISO/IEC 14443 protocol specifies wireless communications at 13.56 MHz. The master for Waiting Time Extension (WTX) communications may be the secure element of the card. Alternatively, the biometric element may be the master for WTX communications. It can be noted that the biometric element can communicate with the antenna independently of the secure element. The card terminal may then be the slave. It may time out if the card does not respond on time. According to the protocol, a terminal (Proximity Coupling Device, PCD) sends commands to a card (Proximity Integrated Circuit Card, PICC). Having transmitted a command, the PCD expects a response before the expiry of a period known as a frame waiting time (FWT). The FWT is negotiated between the PICC and the PCD. In some protocols (e.g. EMVCo) the maximum value of the FWT may be 38.66 ms. In other protocols (e.g. ISO14443) the maximum value of the FWT may be between 4 and 5 seconds. If the FWT expires with no response having been received from the PICC, the PCD can assume that communication has been interrupted. It may then attempt to start a new communication session with the PICC. The PICC can keep a communication session from timing out by transmitting a frame waiting time extension command ("S(WTX)") to the PCD. On receipt of an S(WTX) command the PCD waits for another FWT. By sending one or more S(WTX) commands the PICC can keep a session alive until it is ready to respond substantively to the PCD.

Steps 4 to 12 of the process described above may take longer than the FWT. To allow the process to complete without the communication session with the terminal being restarted, the card can send one or more S(WTX) commands during the process.

To permit one or both of the biometric element and the secure element to complete processes that may take longer than the FWT, the biometric element and the secure element can communicate with each other to cause the secure element to transmit S(WTX) commands to keep the communication session alive. Preferably, the biometric element can verify that an S(WTX) command has been sent. The ability to do so is useful when the MCU synchronises the start of processing with the completion of S(WTX) transmission since when the MCU is aware of a pending S(WTX) transmission it can go into a low power state immediately. These steps may be implemented by various protocols between the secure element and the biometric element. For example, the biometric element may transmit a request to the secure element for an S(WTX) command to be sent, and the secure element may signal the biometric element when that command has been sent. An efficient approach is for a signal line between the secure element and the biometric element to be set by the secure element to a first value (e.g. 0 or low) when an S(WTX) command has been transmitted, and to a second value (e.g. 1 or high) a predetermined period after the last S(WTX) command was transmitted. That predetermined period may be shorter than the FWT. In that approach the biometric element can consider itself authorised to perform biometric processing while the signal line is at the first value. Other approaches for achieving this result are described in the applicant's co-pending patent application under reference IDX01-130305 GB entitled Contactless Device Process Scheduling.

Figure 3:
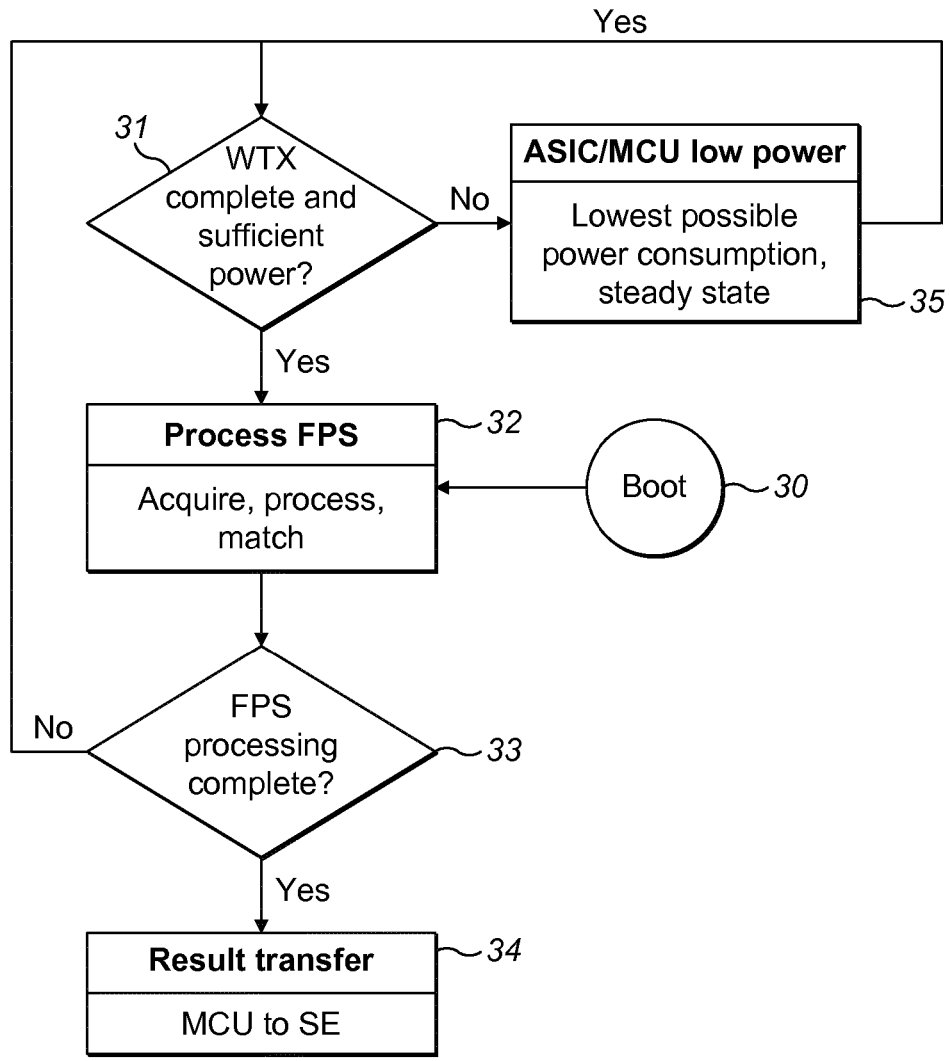
FIG. 3 illustrates a first aspect of a biometric verification process.

FIG. 3 shows how the biometric element may perform the process of biometric verification. The biometric element operates so as to be compatible with a protocol in which a session can time out after a predefined period, but that period can be extended by transmission of an extension message. At step 30, the biometric element is booted up, for example in response to a request from the secure element. This corresponds to step 6 of the process described above. The biometric element may then verify that the power management state of the system is such that its biometric processing can proceed. This involves verifying that sufficient power is available to complete one or more predefined chunks of processing. This could be implemented by step 31, or at least part of it, being implemented immediately after boot. When the card is being powered in a contactless manner, the amount of power available will depend on how much energy is being harvested from the antenna. If that is verified successfully, or if not verification is done at that stage, then the process proceeds to step 32 where the chunk(s) of processing is/are performed. The system may optionally perform a check prior to step 32 of whether an object is physically present at the sensor. This avoids use of power to attempt to detect a fingerprint when there is no finger present at the sensor. Then at step 33 the system assesses whether biometric processing is complete. If not, the algorithm passes to step 31. At step 31 the system (i) verifies that an S(WTX) command has been transmitted by the PICC to the PCD and (ii) verifies that sufficient power is available to complete one or more predefined chunks of processing. If processing is complete then at step 34 the result is returned to the secure element.

The complete flow of biometric processing is divided into a set of chunks. Each chunk except for the last is defined so that it ends in the generation of an interim result or state. That state can be stored, e.g. in memory 12 or other storage accessible to the biometric element. Then processing by the biometric element can be suspended and, optionally, be placed in a low power mode. Since the interim result or state has been stored, the processing flow can be resumed at a later stage by re-configuring the biometric element with the stored result or state. Furthermore, as indicated in FIG. 2, the biometric element may be divided into a set of subsystems. Each subsystem may be configured for performing a respective portion of the processing flow. When a chunk is to be performed, only the subsystem that is required to be active to perform that chunk need be taken out of a low power mode. This process is illustrated in more detail in FIG. 4.

Figure 4:
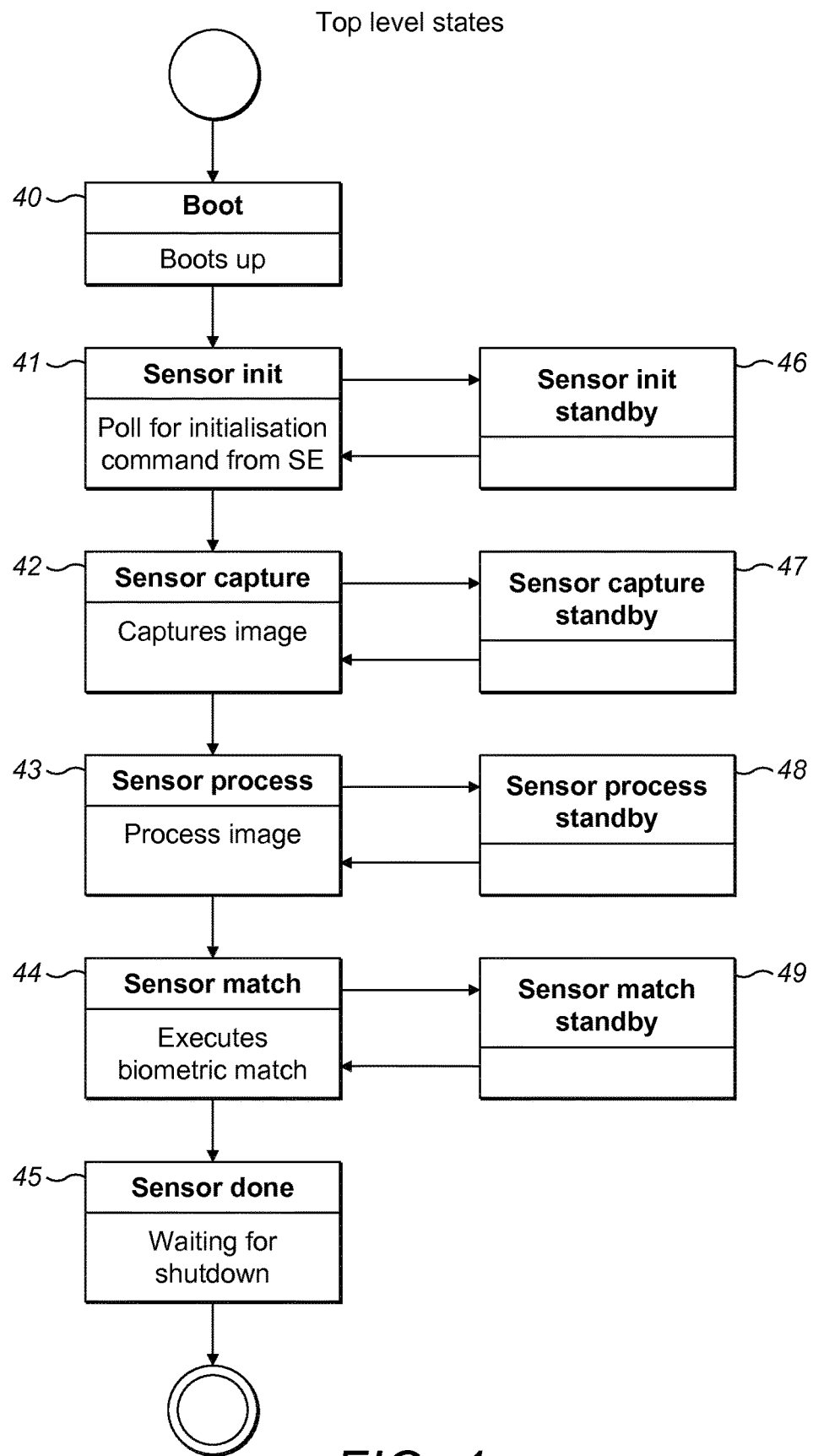
FIG. 4 illustrates a second aspect of a biometric verification process.

At step 40 of FIG. 4 the biometric element is booted up. This corresponds to step 30 of FIG. 3. Steps 41, 42, 43 and 44 of FIG. 4 show various processing stages in the collection and analysis of biometric data. These are: testing of the biometric sensor (41), capture of data from the sensor (42), processing of data from the sensor to render it compatible with the stored reference template (43) and comparison of the sensed data with the reference template or templates (44). In the case where a fingerprint is being sensed, step 41 may involve undertaking power-up, self-test and calibration operations on the fingerprint sensor, step 42 may involve polling pixels and/or lines of the sensor to collect fingerprint data, step 43 may involve noise filling, adjusting grey levels, scaling and feature detection, and step 44 may involve comparison of the processed sensed data with a stored reference template or templates. Once the final result has been generated and sent to the secure element the biometric element can be shut down (step 45). A series of standby states 46, 47, 48, 49 are available. Each standby state corresponds to one of the processing steps 41 to 44. When one of the processing steps is being implemented the components of the biometric element that are required to implement that step are powered up in a relatively high power state, enabling them to implement that step, and the other components of the biometric element are powered down or in a relatively low power state. When the system transitions from one of steps 41 to 44, which are active states, to the corresponding one of the standby states 46 to 49 the state of the components of the biometric element that were active, and/or their interim result, is stored. Then the components that were active are powered down or put into their relatively low power state. When the system transitions from one of the standby states steps 41 to 44 to the corresponding one of the standby states 46 to 49 the state and/or the interim result that were stored are re-loaded into the appropriate components so as to enable them to resume processing, and those components are placed back into a relatively high power, operational state. This allows processing to be suspended to a low power state and then resumed.

The management of the suspending and resuming of components of the biometric element as shown in FIG. 4 can be managed by the biometric MCU 27 or power management unit 26.

The timing of the transitioning between operational states 41 to 44 and standby states 46 to 49 can be controlled by the secure element signalling the biometric element as described above. (Alternatively it may be controlled by the biometric MCU and the biometric MCU may signal to the secure element that the biometric MCU is in a low power state, whereupon the SE can handle extending the wait time). This allows the secure element to cause the biometric element to enter a standby state when a S(WTX) command needs to be sent, and to resume biometric processing when the S(WTX) command has been sent. The biometric element may transition to the appropriate standby state when signalled by the secure element. The biometric element may transition to the appropriate operational state when (i) signalled to do so by the secure element and (ii) there is sufficient power available to drive the components needed to implement that operational state in order to complete one or more chunks of work.

Thus, biometric processes to be implemented by the biometric element are broken down into discrete operations ("chunks") at points where it is possible to pause and then resume execution, preferably without storing an excessive amount of state/result data. The discrete operations may conveniently be selected so that they take the biometric element less than the timeout interval of the communications protocol with the terminal to complete. Then the system can resume safely to a standby state when an operation is complete, without it being interrupted by the secure element needing to send an S(WTX) message. The discrete operations start/resume when the system determines that there is sufficient power to carry them out and that there is sufficient time for each operation to complete without disrupting the scheduled transmissions between the PICC and PCD mandated by the communications protocol in use between them. A discrete operation may be any one of the fingerprint verification steps outlined earlier, may be a combination of any of the fingerprint verification steps, or may be a further sub-division of any one of the fingerprint verification steps. Many different possible discrete operations could be defined, depending on how the biometric sensor operates.

As indicated above, components of the biometric element that are not in use can be put into a low power mode. At the beginning of a sequence of operations involving a component the component is booted up. During the sequence of operations, when processing is not being carried out, the component can be put in a low power, standby mode. At the end of the sequence of operations involving the component, the component is put into a low power state. For example, during biometric sensing the biometric element may be initially booted up, then during the sequence of processing, it enters and leaves standby states periodically, as shown in FIGS. 3 and 4. At the end of the sequence of operations, it is powered down once more. Meanwhile, unused components of the biometric element can remain in a low power state. These features can help reduce the energy consumed by the biometric element. Since only limited power is available when the biometric element is wirelessly harvesting energy, this can reduce the time required to perform biometric processing. In addition to not using up the power budget by powering elements when they are not required, halting all digital and analogue activity at the biometric element when it is not in use (e.g. for testing or for sensing biometric data) may have the additional advantage in that it can avoid current noise spikes feeding back into the PICC antenna.

Various mechanisms are available for synchronising between the biometric element and the secure element so that the biometric element will pause processing when a wait time extension message is to be sent and resume processing when a wait time extension message has been sent. In one example, a command can be sent from the secure element to the biometric element which, when received by the biometric element causes it to suspend biometric processing. This may be referred to as a "wait for WTX complete" (WTXC) message. In an alternative embodiment, the secure element can drive a line between the biometric element and secure element to change state, and the biometric element may be responsive to (i) that line entering a first state to suspend its processing and (ii) that line entering a second state to resume processing. In a further alternative embodiment, the biometric element may signal to the secure element that (i) its processing has suspended and (ii) acknowledgement to resume processing. Further detail of mechanisms for achieving this result are described in the applicant's co-pending patent application under reference IDX01-130305 GB entitled Contactless Device Process Scheduling.

The circuit(s) used to harvest energy from the wireless field may be conventional. For example, an alternating current driven by the antenna may be rectified and used to charge a capacitor. The capacitor can then drive loads on the chip. The amount of available power can be sensed by, for example, sensing the voltage across the capacitor. Energy harvesting may be performed by either or both of the secure element and the biometric element and/or by a central energy harvesting component of the card which could provide power to both the secure element and the biometric element.

Each discrete operation involves using one or more components of the biometric subsystem. The amount of power required by each of those components to perform that operation is determined in advance and stored, e.g. in the biometric MCU 27 or in power controller 26. The power requirements could be stored in a look-up table. In order to determine if there is sufficient power to carry out any discrete operation of those predetermined operations, the power requirements for the elements required to be involved in implementing that operation are summed. The total power requirement for that operation can then be compared with the available power. If the available power is insufficient to allow the operation to be completed then the biometric element can wait until sufficient power is available. It may continue to check for available power whilst it is enabled for processing, or it may wait until it is next enabled for processing after an S(WTX) message has next been sent. Otherwise it can begin performing the operation.

FIG. 5 shows an example of a table storing power usage information for components of a biometric element. The table shows the state each element (e.g. SE, Biometric MCU, Biometric ASIC) is in for each operation or set of operations. A practical table will also show the associated power budget required for each element. The final column shows the total power budget. Unused elements can be powered down, or in standby mode, whenever possible.

The discrete operations may be selected in any suitable way. In the case of image acquisition (e.g. for a fingerprint sensor), the detection of the image may be done by raster scanning the image field. Conveniently, the image sensor can be configured with split reference pickup lines, as described in U.S. Pat. No. 9,779,280. This can assist in the removal of common mode noise from the received signal. In one arrangement of sensor the sensor may have sensing locations defined at the intersection of drive lines and pickup lines. The sensor may be divided into non-overlapping quadrilaterals, e.g. four quadrants. Each quadrilateral may be provided with one or more dedicated pickup lines and/or one or more dedicated drive lines. Dedicated lines may serve only that quadrilateral. The biometric element may schedule the number of lines in a selected quadrilateral to be scanned during the next discrete operation. This may be fewer than the total number of lines in a quadrilateral. When those lines are scanned, the biometric element may suspend its scanning operations and wait to be signalled by the secure element after the next successful WTX transmission. Alternatively, the biometric element may continue scanning until it is interrupted by the secure element in the manner described above, and in response to that interruption suspend its scanning operations and wait to be signalled by the secure element after the next successful WTX transmission.

An advantage of suspending one or more operation of the biometric element when wireless communication is taking place can be that power drawn by the biometric element may appear as noise in the signal between the terminal and the secure element, which may disrupt communications.

In practice, there may be a wide span of power requirements amongst the various operations. For example, operations concerning image acquisition, image processing and image matching typically require significantly more power than communicating a signal between the SE and the biometric element, or transmitting a S(WTX) message.

Depending on the chosen functional architecture, some operations may require an ASIC and a biometric MCU to be active, while others may require only a biometric MCU to be active and still others may require only the SE to be active.

Therefore, it is possible that some operations can be carried out when the level of available power is low, but other operations cannot.

In one approach, available power is measured and compared to the respective power budget for the operation to be carried out and a binary decision is made as to whether the power is sufficient to perform the operation, as described above with reference to step 31.

In another approach, power thresholds are defined to distinguish power levels where particular operations are possible. There may, for example be two thresholds chosen, but a single threshold or more than two thresholds could be defined. In the two-threshold case if the available power is below a threshold 1, there is deemed to be insufficient power to carry out biometric processing. Then all processing components of the biometric element (e.g. an ASIC and an MCU) can be maintained in a low-power mode to reduce consumption. If the available power is above threshold 1 but below a threshold 2, there may be enough power to operate one or more components of the biometric element (e.g. the MCU) but not one or more others (e.g. the ASIC). Then the system may proceed with only operations that require the components that require less power than defined by threshold 2. If the available power is above threshold 2 then there is enough power to drive all components of the biometric element (e.g. both the ASIC and the MCU). When the available power is above threshold 2, any task that requires either or both of these elements can be proceeded with. In a practical embodiment threshold 1 may be in the range from 1V to 3V and threshold 2 may be in the range from between 4V to 6V. Operations requiring the use of a microprocessor may be enabled only if the available drive voltage is at or above threshold 1. Operations requiring the use of a dedicated hardware processing unit such as an ASIC may be enabled only of the available drive voltage is at or above threshold 2.

The thresholds may be implemented with hysteresis. This can inhibit high frequency switching between power threshold levels and possible system instability.

The thresholds may be dynamic or hard-coded. The biometric element may be configured to set one or more thresholds during operation. For example, a threshold may be set to the power requirement of the load that is scheduled to be used to implement the next discrete operation.

The scheduling of a discrete operation may take into account the available power. Operations may be prioritised that best fit the available power level. For example, if the power is measured as being at a first level and there are operations that need to be carried out that require more than that level of power and operations that need to be carried out that require less than that level of power then the system could select the lower power operations for execution. To permit this, the set of operations to be performed for biometric processing could be arranged so that they can be performed in any order provided the result(s) required by an operation are already available. For example, in some architectures, when a fingerprint is being read from a fingerprint sensor the data from the sensor may be read and stored in a memory, which may require a relatively low level of power, and that data may then be processed by an ASIC, which may require a relatively high level of power. When sufficient power is available to run the ASIC, and there is unprocessed data available in the memory then the ASIC could be operated. When there is insufficient power to run the ASIC but sufficient power to read data from the sensor and store it in memory then data could be read from the sensor. In this way, the operations can be scheduled to make efficient use of available power.

A check for available power can be made on a periodic basic, or between discrete operations or groups of discrete operations. An example would be to check that, on ending an image acquisition operation, power remains sufficient to start an image transfer task. If power permits, processing continues as originally scheduled but if the power drops below the necessary threshold, the scheduled operations can be halted and either the biometric element can enter a suspend state or different operations can be scheduled.

A further input into the decision as to whether power is sufficient may be pre-stored information regarding the respective power requirements of the digital and analogue components of the biometric element. The digital and analogue components may operate with significantly different voltage supplies. Typically, there will be aspects of the biometric element (e.g. the sensor) that operate in the analogue domain while at least some other parts of the biometric element operate in the digital domain. Analogue domain activities generally require a higher supply voltage than digital logic.

For example, analysing some of the discrete operations may indicate that image acquisition needs the analogue front end (AFE) of the biometric sensor to be active in addition to digital logic to operate, whereas an operation such as image processing does not need the analogue front end to be active and only needs digital logic. Also, digital power consumption can be easier to regulate, for example using clock scaling. Any functions described herein that can be performed in the digital domain may be subject to clock scaling in dependence on an estimate of available energy. In addition to digital logic, certain support functions may also be active, such as brownout detection circuits and clock detection circuits.

To allow operation at reduced input supply, it is preferred that the biometric element uses parallel regulators to allow higher supply domains to be turned off. Then brownout detection may be only implemented in active domains. Thus, brownout detection can be disabled for domains that are not active. For example, during image acquisition when both analogue and digital logic are operating, brownout detection may be operational to detect whether the sensed supply voltage $V_{SENSE}$ is below a first threshold. That threshold may, for example, be 2.2V. In a simple energy harvesting system, the maximum current may be given by the minimum permissible $V_{SENSE}$ and the impedance of the PICC antenna. During modes when digital processing is needed and the analogue front end is inactive, $V_{SENSE}$ can be permitted to drop down further, e.g. to not less than 1.2V. The current from the energy harvesting system can then be greater than in the first mode.

It is desirable for the biometric element to generate relatively little noise when a WTX signal is being transmitted. This can increase the chance that the WTX signal is successfully received by the card terminal. One way of achieving this, as described above, is for the biometric element to acquire and validate the biometric data between WTX transmissions and then send the result of that to the secure element, as described above. In an alternative arrangement, the functions could be split differently between the biometric element and the secure element. For example, the secure element could acquire data defining the sensed biometric features (e.g. a fingerprint) before it starts communicating with the card terminal. The secure element may then verify the sensed data and report to the card terminal on the result. Since the verification of the biometric data can be performed entirely in the digital domain, it can readily be suspended and resumed around the transmission of WTX messages. This approach introduces additional latency before the secure element initially signals the card terminal. However, that latency may be relatively small.

In the examples given above, the secure element and the biometric element are on a smart card. They could be implemented on other physical objects. For example, they could be integrated into a communication device such as a mobile phone, integrated into an automotive component, implemented on a dongle, a wallet, a badge, sticker, watch, jewelry, a wearable, electronic passports, USB-based tokens, subscriber identification modules (SIMs) or in any other convenient way.

In the examples given above, the biometric element and the secure element cooperate to inform a terminal of the validation state of biometric data presented to the card. Other biometric functions could be performed in an analogous way. For example, the biometric element could perform enrolment of a biometric feature by reading it and storing data describing it in non-volatile memory of the card. The stored data may then be read from that memory later in order to perform validation as described above.

In the examples given above the term power may be understood to refer to any relevant feature of energy availability. Examples include available energy, voltage, current and power or any combination thereof.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A device comprising:
an antenna;
a power harvesting circuit for harvesting power from a radio frequency field received at the antenna in order to power functions of the device;
a communication unit comprising a first integrated circuit coupled to the antenna for transmitting and receiving signals by means of the antenna, the communication unit being configured to communicate according to a protocol in which a party to a communication session deems the session to have timed out if during a predetermined period it does not receive a signal from another party to the session; and
a module comprising a biometric reader with a biometric sensor and a processing circuit;
the device being configured to interrupt the operation of the module in response to receiving a signal from the communication unit, after which the communication unit transmits a signal by means of the antenna,
wherein the communication unit is configured to:
receive a request for identity verification from a first party to a communication session in which the device is also a party,
in response to receiving that request, signal the module to perform an identity verification process,
maintain the communication session until the identity verification process is complete by periodically transmitting a message to the first party,
receive a result of the identity verification process from the module, and
transmit the result of the identity verification process to the first party,
wherein the communication unit is configured to:
on transmitting the message to the first party, signal the module with a first additional signal, the first additional signal having a first format, and
wherein the module is configured to:
in response to receiving the first additional signal having the first format, resume operation, and
wherein the communication unit is configured to:
a predetermined time interval after transmitting the message to the first party, signal the module with a second additional signal, the second additional signal having a second format, and
wherein the module is configured to:
in response to receiving the second additional signal having the second format, interrupt the operation of the module, and
on interrupting operation, transmit a signal to the communication unit.

2. A device as claimed in claim 1, wherein the communication unit is configured to maintain the communication session until the identity verification process is complete by periodically transmitting a wait time extension message to the first party.

3. A device as claimed in claim 1, wherein the module is configured to, on receiving a signal of the first format, transmit an acknowledgement signal to the communication unit.

4. A device as claimed in claim 1, wherein:
the first and second additional signals are represented by high and low states of a single signal line.

5. A device as claimed in claim 1, wherein the module is configured to, on interrupting operation, store a state of at least one active component of the module, and set at least that component in a low power state.

6. A device as claimed in claim 1, wherein the module is configured to, on beginning or resuming operation, sense an amount of power available from the power harvesting circuit and select for execution a task requiring not more than the amount of power available.

7. A device as claimed in claim 6, wherein the module comprises a first subsystem having a relatively high power requirement and a second subsystem having a relatively low power requirement and the module is configured to, on beginning or resuming operation, sense the amount of power available from the power harvesting circuit and to, if a first task involving use of the first subsystem and a second task involving use of the second subsystem and not the first subsystem are both available for execution, select for execution the second task if insufficient power is available to meet the requirement of the first subsystem.

8. A device as claimed in claim 7, wherein the module is configured to, if sufficient power is available to meet the requirement of the first subsystem, select the first task for execution.

9. A device as claimed in claim 6, wherein the module is configured to, on beginning or resuming operation, sense the amount of power available from the power harvesting circuit and to, if a first task having a first power requirement is available for execution, to commence execution of that task only if sufficient power is available to complete the task.

10. A device as claimed in claim 1, wherein the communication unit is implemented in the first integrated circuit and at least part of the module is implemented in a second integrated circuit.

11. A device as claimed in claim 10, wherein the first integrated circuit is a secure element.

12. A device as claimed in claim 1, wherein the device is in the form of a card.

13. A device as claimed in claim 1, wherein the device is an identity verification device and the module is the biometric reader comprising the biometric sensor for sensing a biometric feature and the processing circuit is configured to process data sensed by the sensor to form processed data and compare the processed data with data defining a reference biometric feature so as to verify a sensed biometric feature.

14. A device as claimed in claim 13, wherein the module is a fingerprint reader.

* * * * *